United States Patent
Kim et al.

(10) Patent No.: US 11,608,038 B2
(45) Date of Patent: Mar. 21, 2023

(54) VARIABLE AIR HOLE COVERING FLAP DEVICE AND OPERATING METHOD THEREOF

(71) Applicants: Hyundai Motor Company, Seoul (KR); Kia Motors Corporation, Seoul (KR)

(72) Inventors: Tae-Hyung Kim, Incheon (KR); Sang-Hyun Park, Seoul (KR); Jung-Ho Kim, Seoul (KR); Jin-Woo Kim, Gyeonggi-do (KR); Sung-Wook Woo, Gyeonggi-do (KR); Jung-Joong Lee, Gyeonggi-do (KR); Hak-Lim Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 213 days.

(21) Appl. No.: 16/915,252

(22) Filed: Jun. 29, 2020

(65) Prior Publication Data
US 2021/0213916 A1 Jul. 15, 2021

(30) Foreign Application Priority Data
Jan. 9, 2020 (KR) ........................ 10-2020-0003041

(51) Int. Cl.
*B60T 5/00* (2006.01)
*B60R 19/00* (2006.01)
(Continued)

(52) U.S. Cl.
CPC ................ *B60T 5/00* (2013.01); *B60R 19/00* (2013.01); *E05F 15/00* (2013.01); *E05F 15/71* (2015.01); *F16D 65/78* (2013.01); *F16D 66/00* (2013.01); *B60R 2019/002* (2013.01); *B60T 2220/04* (2013.01); *B60T 2250/04* (2013.01); *E05Y 2400/10* (2013.01); *E05Y 2900/53* (2013.01); *F16D 2065/783* (2013.01); *F16D 2066/001* (2013.01)

(58) Field of Classification Search
CPC ............. E05Y 2400/10; E05Y 2900/10; F16D 2065/783
USPC ........................................ 188/264 a, 264 aa
See application file for complete search history.

(56) References Cited

U.S. PATENT DOCUMENTS

| | | | | |
|---|---|---|---|---|
| 3,491,856 | A | * | 1/1970 | Dean ..................... F16D 65/847 192/104 R |
| 6,155,650 | A | * | 12/2000 | Barger .................. F16D 65/847 188/264 AA |

(Continued)

FOREIGN PATENT DOCUMENTS

| | | | | |
|---|---|---|---|---|
| DE | 102017107462 | A1 | * | 10/2018 |
| DE | 102018108064 | A1 | * | 10/2018 ........... B60K 11/085 |

(Continued)

*Primary Examiner* — Melanie Torres Williams
(74) *Attorney, Agent, or Firm* — Fox Rothschild LLP

(57) ABSTRACT

A variable air hole covering flap device is provided and selectively opens or closes an air hole formed in a wheel deflector or a wheel cover to allow air to be introduced toward a brake. The air hole is opened only when brake cooling of a vehicle is more necessary than aerodynamic performance of the vehicle to properly control the aerodynamic performance and the brake cooling performance of the vehicle as necessary.

16 Claims, 8 Drawing Sheets

(51) Int. Cl.
*E05F 15/00* (2015.01)
*F16D 65/78* (2006.01)
*F16D 66/00* (2006.01)
*E05F 15/71* (2015.01)

(56) References Cited

U.S. PATENT DOCUMENTS

| | | | | |
|---|---|---|---|---|
| 7,594,567 B2 * | 9/2009 | Sabelstrom | ........... | B60B 7/0086 |
| | | | | 188/71.6 |
| 2015/0345578 A1 * | 12/2015 | Nightingale | ............ | F16D 65/78 |
| | | | | 188/264 AA |
| 2020/0114982 A1 * | 4/2020 | Parry-Williams | ......... | B60T 5/00 |

FOREIGN PATENT DOCUMENTS

| | | | | | |
|---|---|---|---|---|---|
| GB | 2535577 A | * | 8/2016 | ................ | B60T 5/00 |
| KR | 2010-0064996 A | | 6/2010 | | |

* cited by examiner

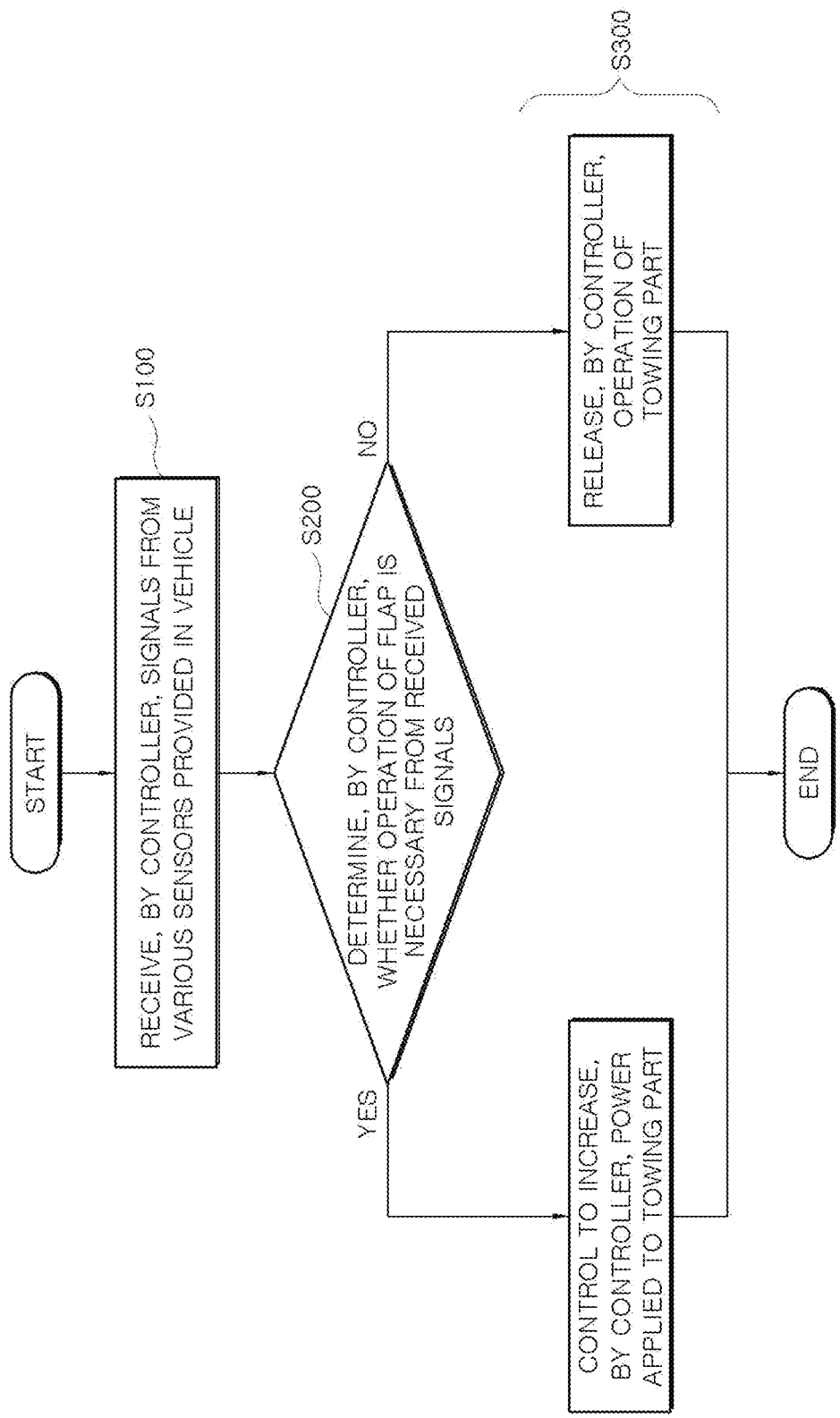

VARIABLE AIR HOLE COVERING FLAP DEVICE AND OPERATING METHOD THEREOF

CROSS-REFERENCE(S) TO RELATED APPLICATIONS

This application claims priority to Korean Patent Application No. 10-2020-0003041, filed on Jan. 9, 2020, which is incorporated herein by reference in its entirety.

BACKGROUND

Field of Present Disclosure

The present disclosure relates to a variable air hole covering flap device and an operating method thereof, and, more particularly, to a variable air hole covering flap device adjusting aerodynamic performance and brake cooling performance of a vehicle according to a driving condition, and an operating method thereof.

Description of Related Art

As shown in FIG. 1 of the related art, to improve aerodynamic performance of a vehicle by appropriately blocking air reaching a tire, a wheel deflector 1 is provided in an undercover 2. Further, as shown in FIG. 2 of the related art, an air hole 3, also known as a NACA (National Advisory Committee for Aeronautics) hole, which is a type of an air inflow hole (e.g., aperture) or duct, is formed in each of the wheel deflector 1 and the undercover 2 to secure air for cooling which reaches a brake. Since the air hole 3 is formed in each of the wheel deflector 1 and the undercover 2, an effect occurring due to the wheel deflector 1 (e.g., improvement of aerodynamic performance of a vehicle) is degraded.

SUMMARY

The present disclosure provides a variable air hole (e.g., aperture) covering flap device that adjusts aerodynamic performance and brake cooling performance of a vehicle by opening an air hole only when brake cooling is more necessary than the aerodynamic performance of the vehicle, and an operating method thereof.

Other objects and advantages of the present disclosure can be understood by the following description and become apparent with reference to the exemplary embodiments of the present disclosure. Also, it is obvious to those skilled in the art to which the present disclosure pertains that the objects and advantages of the present disclosure can be realized by the means as claimed and combinations thereof.

In accordance with an exemplary embodiment of the present disclosure, a variable air hole covering flap device may be configured to selectively open or close an air hole (e.g., aperture) formed in a wheel deflector or a wheel cover to allow air to be introduced toward a brake. The air hole may include a first flap disposed at a boundary portion between the wheel cover and an undercover and having a first end portion hinge-fixed to the undercover to dispose the first flap on one side of the boundary portion, a second flap having a first end portion hinge-fixed to a second end portion of the first flap and a second end portion configured to move along a surface of the undercover due to an external force, a towing part configured to selectively generate a magnetic force toward the second end portion of the second flap, and a controller configured to adjust power applied to the towing part. Additionally, a magnetic object may be installed in the second end portion of the second flap.

A protruding plate that protrudes toward the ground may be provided at a hinge configured to connect the first flap to the second flap. The controller may be configured to adjust the power applied to the towing part based on a signal received from a temperature sensor configured to measure a brake temperature. When the brake temperature is determined as being greater than a reference value, the controller may be configured to increase the power applied to the towing part. The controller may be configured to receive an operating signal of a brake pedal and adjust the power applied to the towing part according to the operating signal of the brake pedal.

When the operating signal of the brake pedal is determined as indicating a sudden stop, the controller may be configured to increase the power applied to the towing part. The controller may be configured to receive a speed signal of a vehicle and adjust the power applied to the towing part according to variance in speed of the vehicle. When the vehicle is determined as rapidly decelerating, the controller may be configured to increase the power applied to the towing part. When the operation of the towing part is released, the second flap and the first flap may be folded and the air hole may be blocked due to air resistance.

In accordance with another exemplary embodiment of the present disclosure, an operating method of a variable air hole covering flap device may include receiving, by a controller, signals from various sensors mounted within a vehicle; determining, by the controller, whether an operation of a flap is required from the received signals; and operating, by the controller, the flap. When the operation of the flap is determined as being required, the controller may be configured to increase the power applied to the towing part in the operating of the flap.

When the operation of the flap is determined as not being required, the controller may be configured to release the operation of the towing part in the operating of the flap. When the controller releases the operation of the towing part, the first flap and the second flap may be folded and an air hole may be blocked due to air resistance. In the determination whether an operation of the flap is required, the controller may be configured to determine whether the operation of the flap is required according to a brake temperature, a degree of the operation of a brake pedal, or variance in speed of the vehicle. The controller may be configured to store a formula, a graph, and a table in which the brake temperature, the operating signal of the brake pedal, or the variance in speed of the vehicle are variables.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present invention, and wherein:

FIG. 8 is a flowchart illustrating an operating method of a variable air hole covering flap device according to an exemplary embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a variable air hole covering flap device and an operating method thereof will be described with reference to the accompanying drawings. As shown in FIGS. 3 to 7, the variable air hole covering flap device according an exemplary embodiment of the present disclosure may be configured to selectively open or close a NACA (National Advisory Committee for Aeronautics) hole H, which is a type of an air introduction or inflow hole (e.g., aperture) and referred to as simply an air hole H hereinafter, formed in each of a wheel deflector D and a wheel cover C to allow air to be introduced toward a brake.

Figure 1:
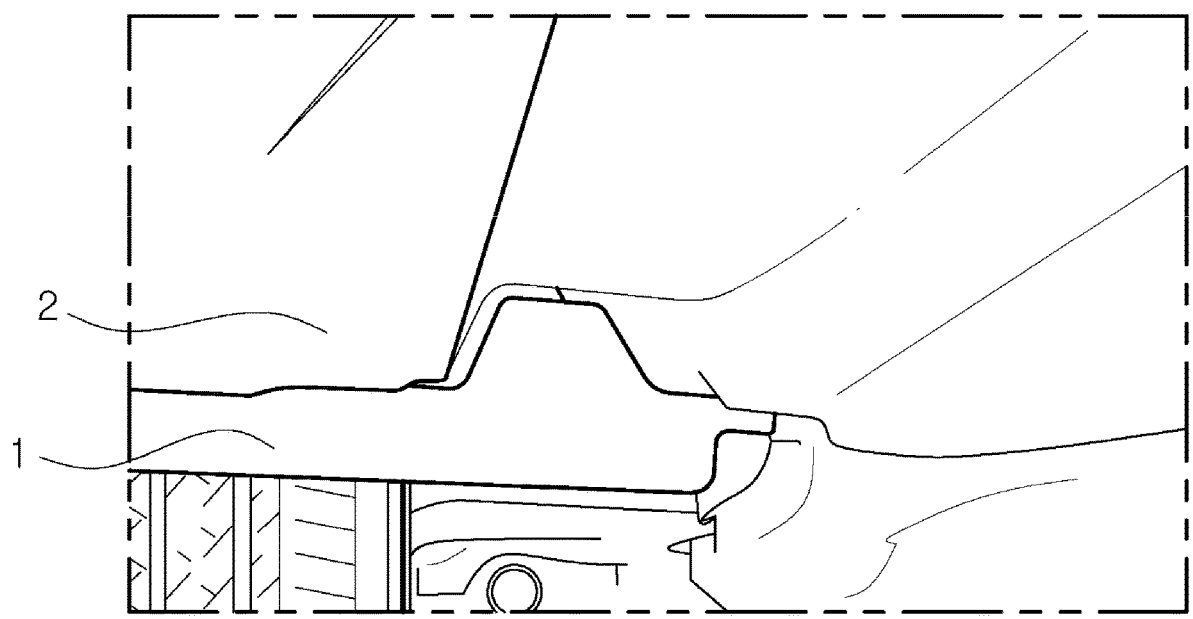
FIG. 1 is a photograph showing a general wheel deflector according to the related art.
Figure 2:
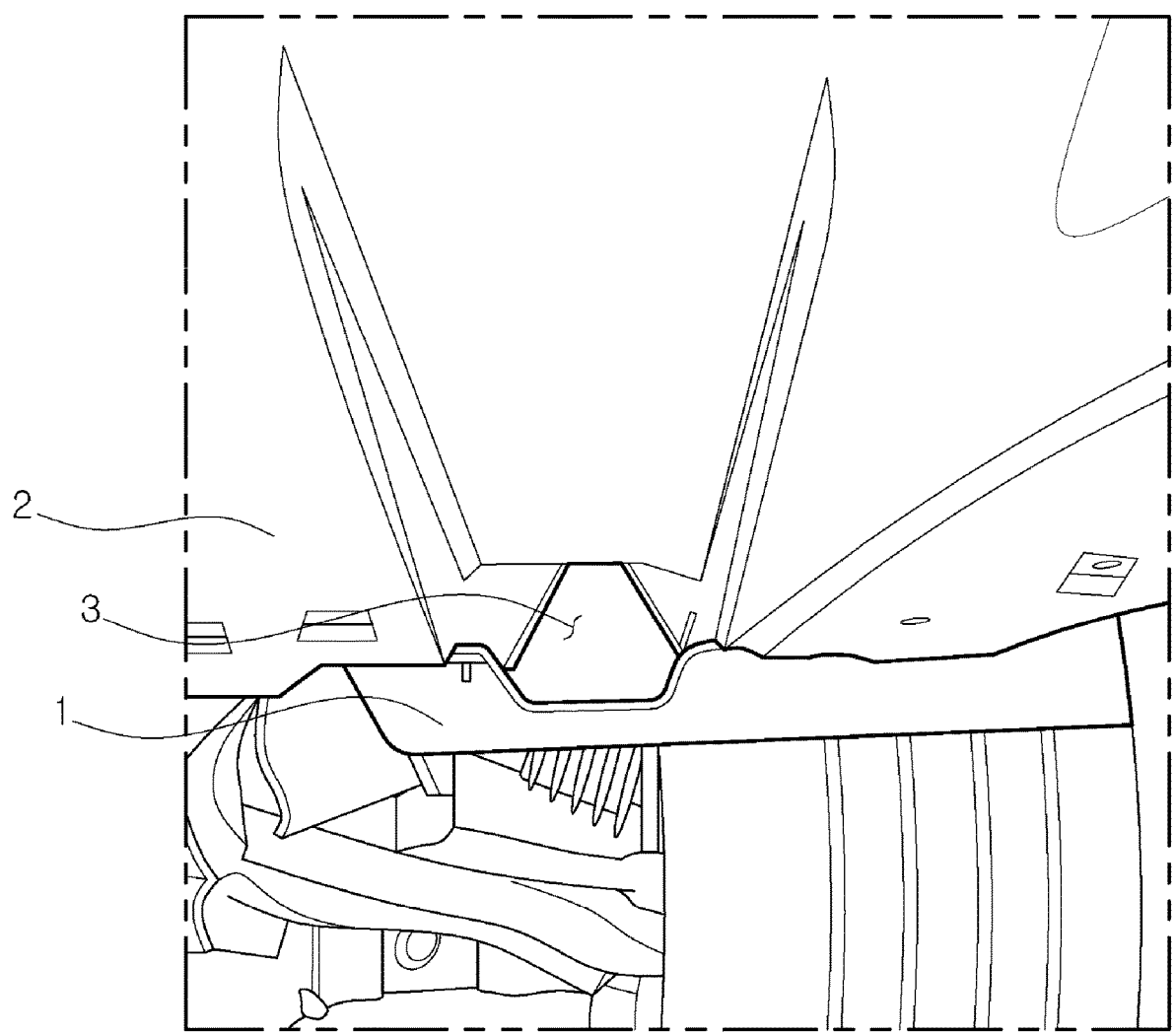
FIG. 2 is a photograph showing a general air hole according to the related art.
Figure 3:
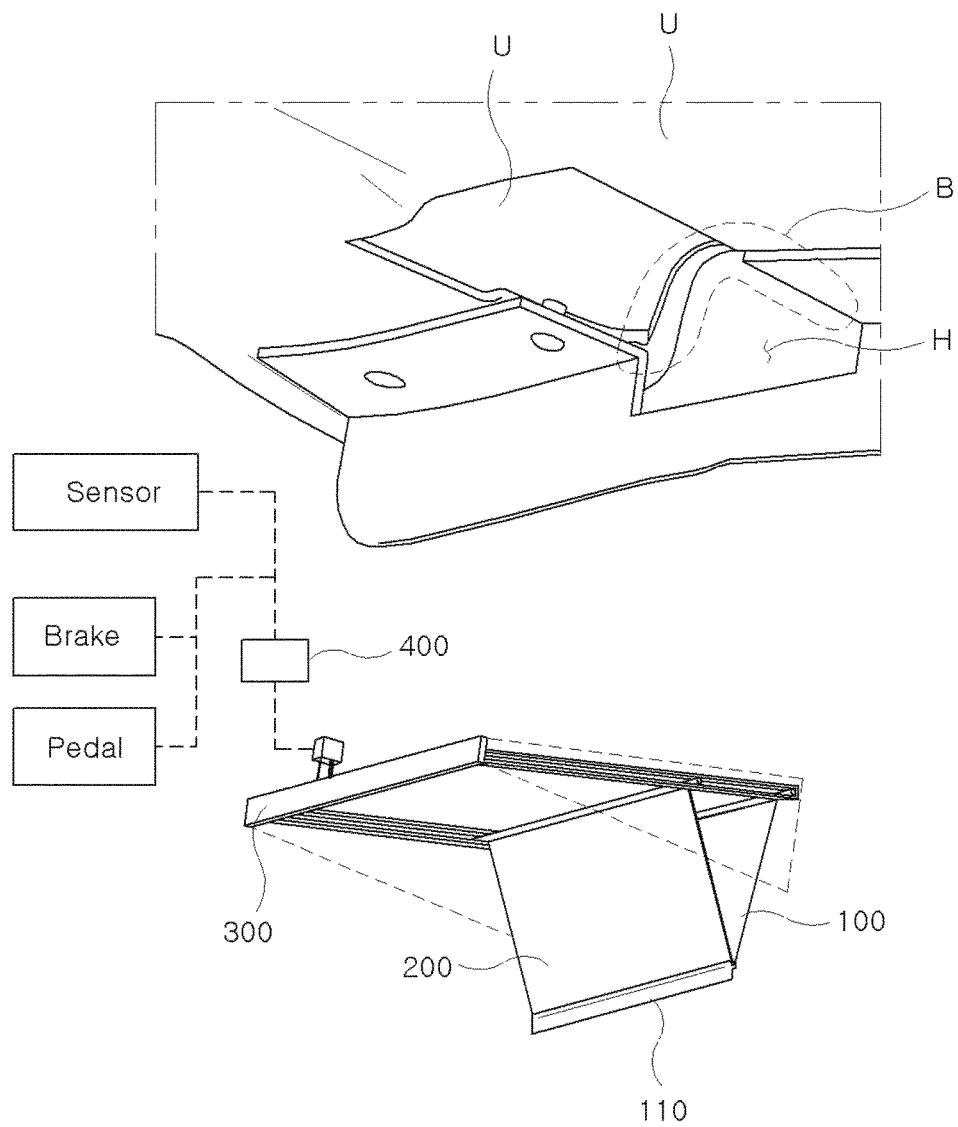
FIG. 3 is an exemplary diagram illustrating a variable air hole covering flap device according to an exemplary embodiment of the present disclosure.
Figure 4:
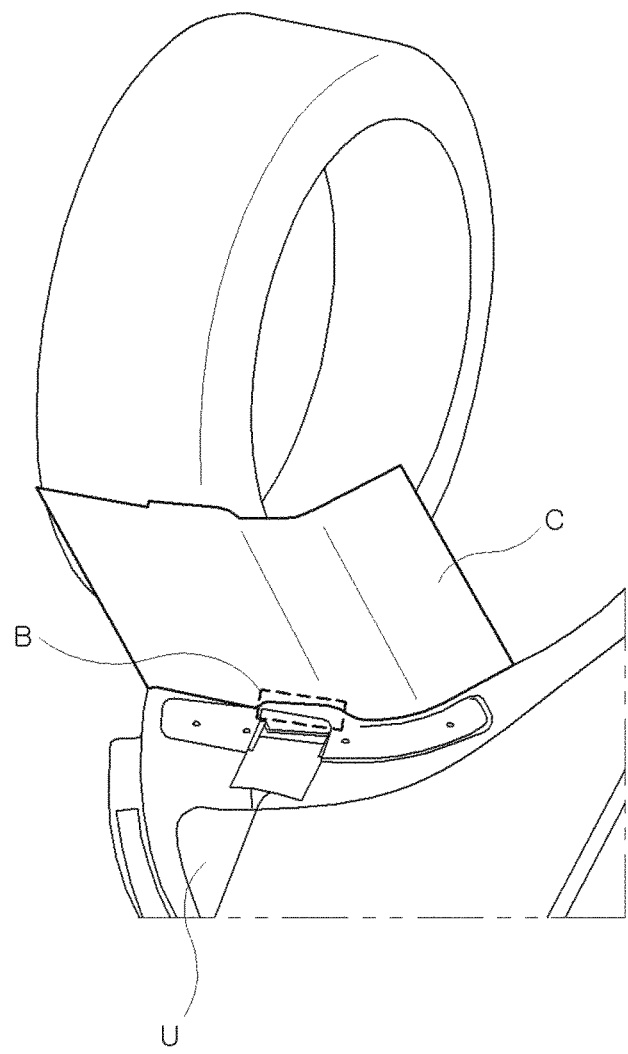
FIG. 4 is an exemplary diagram illustrating a state in which the variable air hole covering flap device of FIG. 3 is installed in a vehicle according to an exemplary embodiment of the present disclosure.

As shown in FIGS. 3 and 4, the air hole H may be disposed at a boundary portion B between an undercover U and the wheel cover C. The air hole H may be formed as a single hole by being connected to the wheel deflector D and the wheel cover C. A guide may be formed in the undercover U to guide a driving wind toward the air hole H. Alternatively, the air hole H may be selectively formed at only any one of the wheel deflector D and the wheel cover C.

The variable air hole covering flap device according an exemplary embodiment of the present disclosure may include a first flap 100 having a first end portion hinge-fixed to the undercover U to be located on one side of the boundary portion B, a second flap 200 having a first end portion hinge-fixed to a second end portion of the first flap 100 and having a second end portion configured to move along a surface of the undercover U due to an external force, a towing part 300 configured to selectively pull the second end portion of the second flap 200 away from the first flap 100, and a controller 400 configured to adjust power applied to the towing part 300. In particular, the towing part 300 may include an electromagnet to generate a magnetic force toward the second end portion of the second flap 200. A magnetic may be installed in the second end portion of the second flap 200 to pull the second flap 200 toward the towing part 300 by the magnetic force of the electromagnet. A rail to which the first end portion of the first flap 100 is coupled may be disposed at the undercover U, and the first end portion of the first flap 100 may slide to move along the rail.

Alternatively, the towing part 300 may include an electric motor, and a pulley or a gear mechanism may be provided at the second end portion of the second flap 200 to move the second end portion of the second flap 200 toward the towing part 300 by the rotational force of the electric motor through the pulley or the gear mechanism. A protruding plate 110 that protrudes toward the ground may be disposed at a connecting part of the first end portion of the second flap 200 and a second end portion of the first flap 100 in a hinge connection, and thus, the second flap 200 may be folded or unfolded against the first flap 100. Due to the protruding plate 110, air resistance may always occur at the first flap 100 and the second flap 200.

Figure 5:
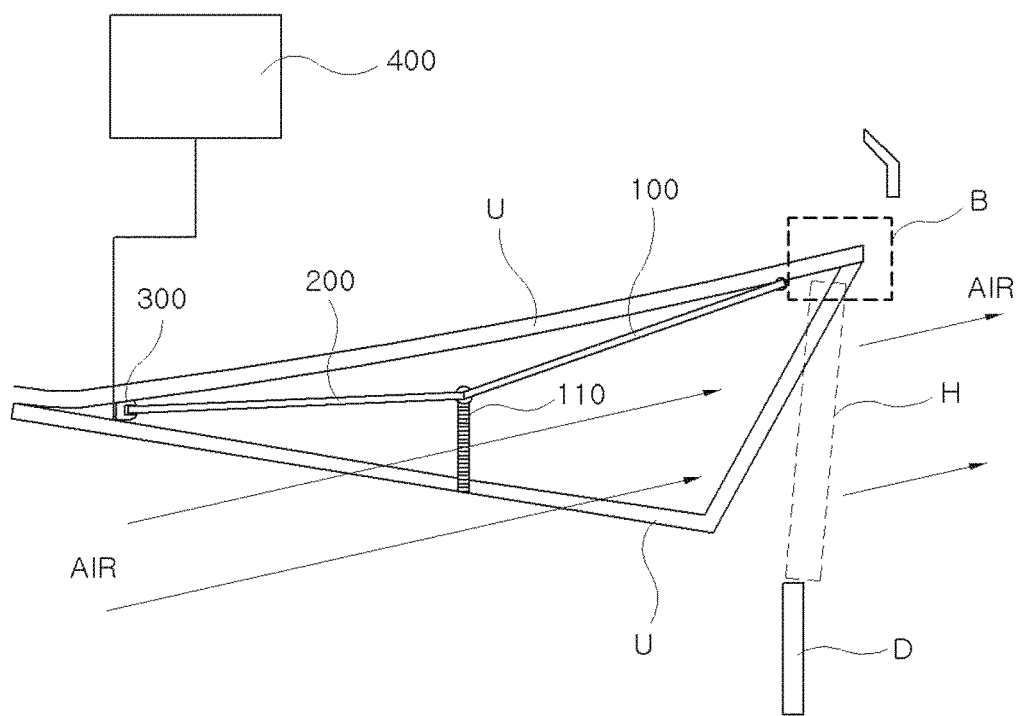
FIGS. 5 to 7 are state diagrams showing an operation of the variable air hole covering flap device of FIG. 3 according to an exemplary embodiment of the present disclosure.

As shown in FIG. 5, when power is applied to the towing part 300 or a magnitude of the applied power is increased, since the first flap 100 moves toward the towing part 300, the first flap 100 and the second flap 200 may be brought into close or abutting contact with the undercover U. Consequently, the air hole H formed in the wheel deflector D may be opened. Due to the opening of the air hole H, an inflow of air into the brake may be increased and cooling performance of the brake may be improved.

Figure 6:
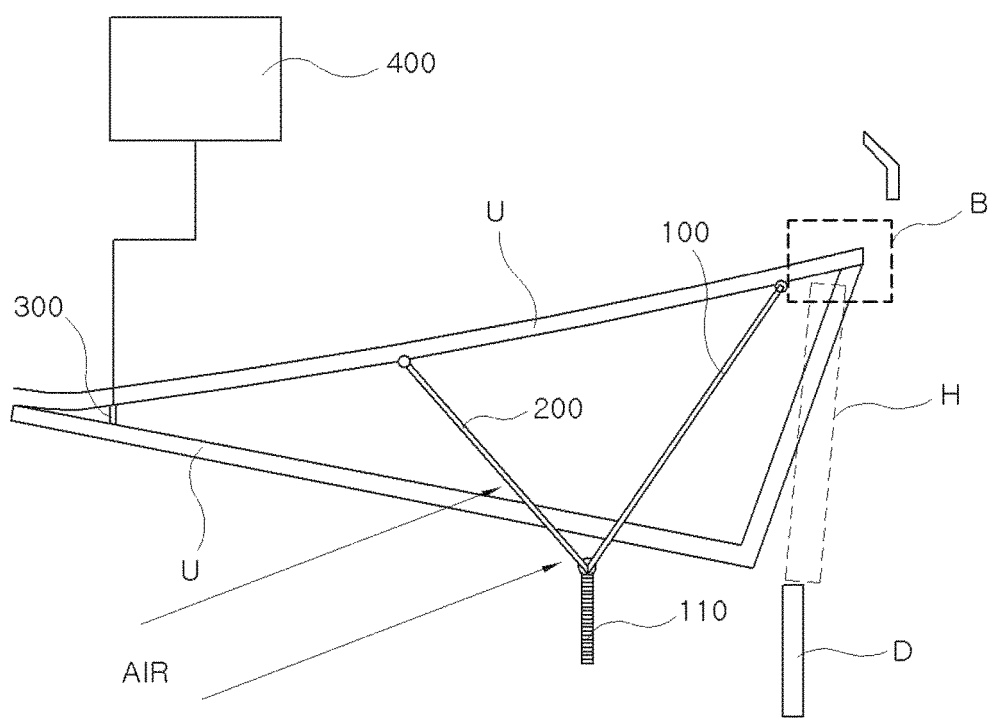

As shown in FIG. 6, when the power applied to the towing part 300 is decreased, the second flap 200 moves to the first flap 100 due to the air resistance acting on the first flap 100 and the second flap 200 by the protruding plate 110. Accordingly, the air hole H may not be completely closed and thus, the inflow and blocking of the air into and from a tire by the wheel deflector D become incomplete states.

Figure 7:
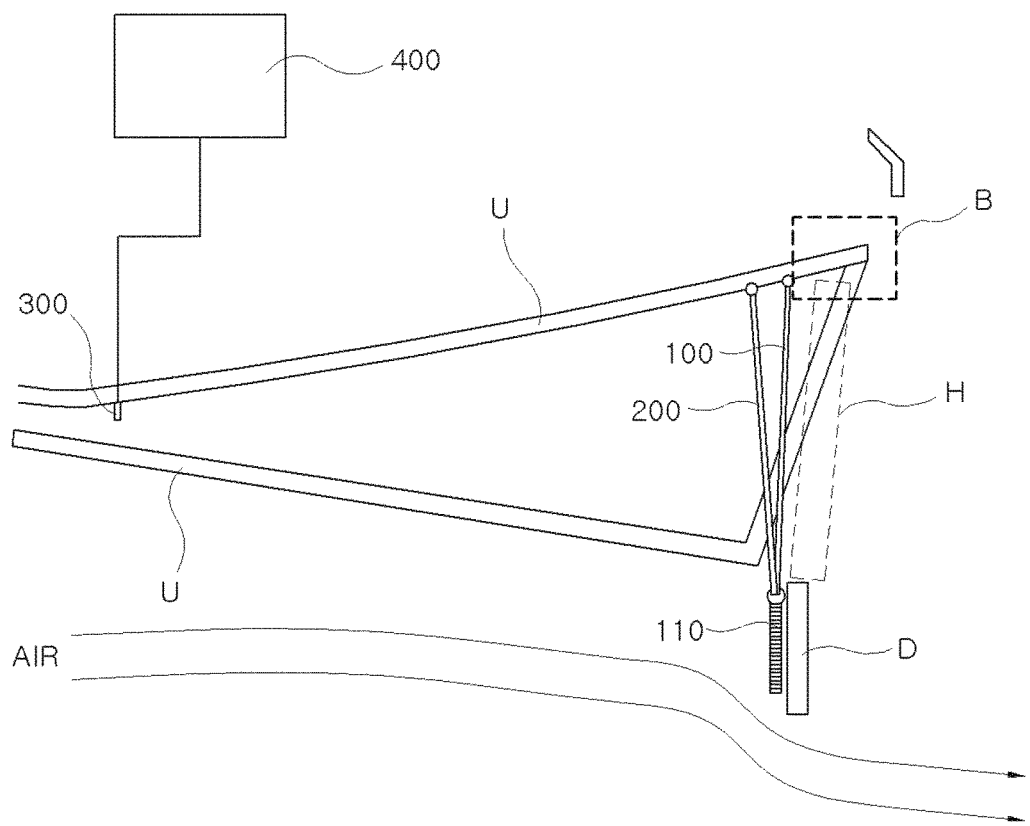

As shown in FIG. 7, when the operation of the towing part 300 is released, the second flap 200 and the first flap 100 may be folded and brought into close contact with each other due to the air resistance acting on the protruding plate 110, the first flap 100, and the second flap 200 based on the hinge connecting the second flap 200 to the first flap 100. Accordingly, the air hole H may be completely blocked by the second flap 200 and the first flap 100. Consequently, the inflow of the air into the brake may be completely blocked, and the inflow of the air into the tire by the wheel deflector D may also be completely blocked. Thus, aerodynamic performance of the vehicle may be improved.

Even when the operation of the towing part 300 is released, when the vehicle is driving on an inclined road or stops suddenly, since gravity or inertia may act greater (e.g. have greater impact) than the air resistance, the close contact between the second flap 200 and the first flap 100 may be released and the air hole H may be opened. When the power is applied to the towing part 300 and the towing part 300 is operated, the state shown in FIG. 6 may be repeated again, and, when a magnitude of the power applied to the towing part 300 increases, the state shown in FIG. 5 may be repeated again.

The controller 400 may be configured to adjust the power applied to the towing part 300 according to a signal received from a temperature sensor configured to measure a brake temperature, an operating signal of a brake pedal received therefrom, or a vehicle speed (e.g., variance in speed) received from a speed sensor. When the brake temperature is determined to be greater than a reference value, the controller 400 may be configured to increase the power applied to the towing part 300 to increase a degree of the opening of the air hole H. For instance, a reference value of the brake temperature is approximately 220° C. for 50 times braking operation in an urban travel and approximately 560° C. for 5 times braking operation in a high speed travel.

When the operating signal of the brake pedal is determined as indicating a sudden stop, the controller 400 may be configured to increase the power applied to the towing part 300. During the sudden stop, heat generated from the brake may be assumed to be increased instantaneously and thus, the degree of the opening of the air hole H may be increased to improve cooling performance of the brake. When the vehicle is determined as rapidly decelerating, the controller 400 may be configured to increase the power applied to the towing part 300. When the vehicle decelerates rapidly, the cooling performance of the brake is assumed to be more important than aerodynamic performance and thus, the degree of the opening of the air hole H may be increased to improve the cooling performance of the brake.

The variable air hole covering flap device configured as described above according to an exemplary embodiment of the present disclosure operates according to a flowchart shown in FIG. 8. The method described herein below may be executed by the controller. As shown in FIG. 8, an operating method of the variable air hole covering flap device according to an exemplary embodiment of the present disclosure may include receiving, by the controller 400, signals from various sensors provided in the vehicle (S100), determining, by the controller 400, whether an operation of a flap is necessary from the received signals (S200), and operating, by the controller 400, the flap (S300).

In the determination in operation S200, in response to the controller 400 determining that the operation of the flap is required, the controller 400 may be configured to increase power applied to the towing part 300 in operation S300 of operating the flap. Accordingly, the initial state shown in FIG. 7 (e.g., aerodynamic performance is improved due to the wheel deflector D) becomes the state shown in FIG. 6 or 5 (e.g., improvement of brake cooling performance due to the opening of the hole-hole H).

In the determination in operation S200, in response to the controller 400 determining that the operation of the flap is not required, the controller 400 may be configured to release the operation of the towing part 300 in operation S300 of operating the flap. As described above, when the controller 400 releases the operation of the towing part 300, owing to the air resistance, the first flap 100 and the second flap 200 may be folded and the air hole H may be blocked. Accordingly, the initial state shown in FIG. 5 (e.g., improvement of the brake cooling performance due to the opening of the air hole H) becomes the state shown in FIG. 6 or 7 (e.g., improvement of the aerodynamic performance due to the wheel deflector D).

As described above, in the determination in operation S200, the controller 400 may be configured to determine whether the flap is required to be operated according to the brake temperature, the degree of the operation of the brake pedal, or variance in speed of the vehicle. The controller 400 may be configured to store a formula, a graph, and a table in which the brake temperature, the operating signal of the brake pedal, or the variance in speed of the vehicle are variables.

In accordance with the variable air hole covering flap device, which is configured as described above, and an operating method thereof according to an exemplary embodiment of the present disclosure, when the brake cooling is prioritized according to a driving condition, the air hole H may be opened by operating the flap, and, when the aerodynamic performance is prioritized, the flap may be maintained in a non-operating state to continue blocking of the air hole H. Consequently, the air hole H may be opened only when the brake cooling of the vehicle is more necessary than the aerodynamic performance of the vehicle and thus, the aerodynamic performance and the brake cooling performance of the vehicle may be properly controlled as necessary.

In accordance with a variable air hole covering flap device, which is configured as described above, and an operating method thereof according to an exemplary embodiment of the present disclosure, when brake cooling is prioritized according to a driving condition, an air hole may be opened by operating a flap, and, when aerodynamic performance is prioritized, the flap may be maintained in a non-operating state to continue blocking of the air hole. Consequently, the air hole may be opened only when the brake cooling of the vehicle is more necessary than the aerodynamic performance of the vehicle and thus, the aerodynamic performance and the brake cooling performance of the vehicle may be properly controlled as necessary.

While the present disclosure has been described with respect to the specific embodiments, it will be apparent to those skilled in the art that various changes and modifications may be made without departing from the spirit and scope of the present disclosure as defined in the following claims. Accordingly, it should be noted that such alternations or modifications fall within the claims of the present disclosure, and the scope of the present disclosure should be construed on the basis of the appended claims.

What is claimed is:

1. A variable air hole covering flap device, comprising:
   an air hole formed in a wheel deflector or a wheel cover and selectively opened or closed by the variable air hole covering flap device to allow air to be introduced toward a brake of a vehicle;
   a first flap disposed at a boundary portion between the wheel cover and an undercover and having a first end portion hinge-fixed to the undercover to dispose the first flap on one side of the boundary portion;
   a second flap having a first end portion hinge-fixed to a second end portion of the first flap and having a second end portion configured to move along a surface of the undercover due to an external force;

a towing part configured to selectively pull the second end portion of the second flap away from the first flap; and
a controller configured to adjust power applied to the towing part.

2. The variable air hole covering flap device of claim 1, wherein the towing part includes an electromagnet to generate a magnetic force toward the second end portion of the second flap, and a magnetic object installed in the second end portion of the second flap.

3. The variable air hole covering flap device of claim 1, wherein the towing part includes a pulley or a gear mechanism at the second end portion of the second flap to move the second end portion of the second flap toward the towing part by the rotational force of the electric motor through the pulley or the gear mechanism.

4. The variable air hole covering flap device of claim 1, wherein a protruding plate that protrudes toward the ground is disposed at a hinge configured to connect the first flap to the second flap.

5. The variable air hole covering flap device of claim 1, wherein the controller is configured to adjust the power applied to the towing part according to a signal received from a temperature sensor configured to measure the brake temperature.

6. The variable air hole covering flap device of claim 5, wherein, in response to determining that the brake temperature is greater than a reference value, the controller is configured to increase the power applied to the towing part.

7. The variable air hole covering flap device of claim 1, wherein the controller is configured to receive an operating signal of the brake pedal and adjust the power applied to the towing part according to the operating signal of the brake pedal.

8. The variable air hole covering flap device of claim 7, wherein, in response to determining the operating signal of the brake pedal as indicating a sudden stop, the controller is configured to increase the power applied to the towing part.

9. The variable air hole covering flap device of claim 1, wherein the controller is configured to receive a speed signal of the vehicle and adjust the power applied to the towing part according to the variance in speed of the vehicle.

10. The variable air hole covering flap device of claim 9, wherein, in response to determining that the vehicle is rapidly decelerating, the controller is configured to increase the power applied to the towing part.

11. The variable air hole covering flap device of claim 1, wherein, when the operation of the towing part is released, the second flap and the first flap are folded and the air hole is blocked due to air resistance.

12. An operating method of the air hole covering flap device according to claim 5, the operating method comprising:
receiving, by the controller, signals from various sensors mounted within the vehicle;
determining, by the controller, whether an operation of the flap is required from the received signals; and
operating, by the controller, the flap,
wherein in response to determining that the operation of the flap is required, increasing, by the controller, the power applied to the towing part in the operating of the flap.

13. The operating method of claim 12, wherein, in response to determining that the operation of the flap is not required, releasing, by the controller, the operation of the towing part in the operating of the flap.

14. The operating method of claim 13, wherein, in response to releasing the operation of the towing part, the first flap and the second flap are folded and an air hole is blocked due to air resistance.

15. The operating method of claim 12, further comprising determining, by the controller, whether the operation of the flap is required according to a brake temperature, a degree of the operation of a brake pedal, or variance in speed of the vehicle.

16. The operating method of claim 15, wherein the controller is configured to store a formula, a graph, and a table in which the brake temperature, the operating signal of the brake pedal, or the variance in speed of the vehicle are variables.

* * * * *